Patented Mar. 6, 1951

UNITED STATES PATENT OFFICE 2,544,636

HIGH-DENSITY, FREE-FLOWING PIGMENT BASES

Dwight Clark Peck, Bergenfield, N. J., assignor to The Egyptian Lacquer Manufacturing Company, Newark, N. J., a corporation of New Jersey No Drawing. Application November 29, 1948, Serial No. 62,593

7 Claims. (Cl. 260—34.2)

This invention relates to free-flowing, high-density pigmented bases suitable for use in the production of paints, enamels, lacquers and related materials, as well as processes for their manufacture.

As is well known, pigmented bases are commercially important because they may readily be converted to a variety of finished paints, enamels or lacquers, simply by the addition of suitable oils, resins and/or solvents. For many years bases of this type have been manufactured by mixing finely ground pigments with a variety of vehicles composed of in some cases, resins and organic solvents, in a pebble or ball mill. To permit the pebbles or balls to cascade through the mix it was necessary to use relatively large amounts of resins and solvents, and correspondingly small amounts of pigments. Sufficient vehicle was added to reduce the viscosity of the mix to the desired level necessary for cascading. The more vehicle required for this purpose the less pigment could be employed, as an increase in one was always at the expense of the other.

Due to the low pigment content of the resulting base mix, it was found that large proportions of base were needed to prepare the ultimate products. Also, due to the low pigment content, it was necessary to process large volumes of base in order to produce a given volume of finished product, thus limiting the production capacity of the equipment. In order to overcome these disadvantages it was necessary to increase the pigment content of the base. This was accomplished by reducing the amount of solvent and increasing the pigment content by approximately the same amount. This practice became general, but led to base mixes which consisted largely of pigment and resin, and were so dough-like that they could not be processed in the customary low-powered pebble or ball mills. It was found that these heavy, dough-like mixes had to be processed in high-powered kneaders or on roller mills. Equipment of this type is expensive and time-consuming, but it produces a base suitable for many more uses than is possible with a pebble or ball mill. Hence, in recent years, a large part of this industry has replaced its pebble and ball mills with much more expensive equipment of this type.

At the time of the invention to be hereinafter described, the paint industry had to make its choice between the foregoing alternatives. If it were desired to employ the relatively cheap pebble or ball mill, a base of low pigment and high vehicle content, unsuitable for many finished products, would have to be prepared. On the other hand, if a highly pigmented base were desired with its resulting manifold uses, the very large expense required for the installation of high-powered milling equipment must be incurred. Despite many attempts to refine each of these prior practices, there was no satisfactory compromise whereby the inexpensive pebble or ball mill might be used to produce an acceptable highly pigmented base.

It is an object of this invention to eliminate the foregoing and other disadvantages of the prior art. A further object is to produce high-density pigmented bases which may be converted to a wide variety of paints, enamels, lacquers and related finishes, merely by the addition of suitable oils, resins, solvents and the like. A still further object is to produce these pigmented bases in inexpensive pebble mills. A still further object is to produce unique, extremely concentrated, free-flowing pigmented bases which may be stored for extended periods of time without re-agglomeration or other deterioration. Additional objects will become apparent from a consideration of the following description and claims.

These and other objects are achieved in accordance with my invention. I have found that instead of increasing the viscosity of a pigment-solvent mix, resins possess the surprising property of breaking this viscosity to a workable level. As a result, I am able to convert a solid, dough-like mix of extremely high pigment content to a free-flowing mix which can be satisfactorily worked in a pebble mill, provided the resin is employed in unusually small amounts and the other factors to be hereinafter described are observed. This discovery is most unexpected as it is an established fact that when a resin is added to a solvent, the viscosity of the latter is increased. Hence, the addition of a resin to a pigment-solvent mix should increase the viscosity of the mix. Despite this general understanding, I have found that when used in accordance with my invention a small amount of resin will actually break the viscosity of a pigment-solvent mix, and convert it from an unworkable mass to a fluid mixture through which pebbles can be readily cascaded in the mill. Strangely enough, if the resin is omitted from my formulations it is usually impossible to mix them in a pebble mill, since no matter how long the mill is operated the mix remains too viscous and dough-like to permit cascading of the pebbles.

This discovery is so contrary to one of the fundamental concepts in this industry that I am uncertain of its precise mechanism. Nevertheless, while I do not wish to be limited to any theory, it is my belief that this unusual phenomenon may be attributable to the following consideration: When mixing a finely ground pigment and a vehicle, composed of a resin and an organic solvent therefor, the function of the mixing is not, as sometimes assumed, to perform work on the pigment and thereby reduce its particle size, but rather to break up the agglomerates of pigment and to remove from the surfaces of the individual pigment particles the film of occluded air which invariably covers them. This film of occluded air clings tenaciously to the surface of each particle and produces a profound increase in the viscosity of the mix, rendering it unworkable in low-powered equipment in the absence of unusually large amounts of vehicle.

In accordance with my invention, the resin content of the vehicle is reduced markedly with a corresponding increase in the pigment content of the mix. It appears that the diluted resin solution is far more effective in displacing the film of air which is tightly adsorbed on the surface of each individual pigment particle than the more concentrated resin solutions used in pigment dispersion processes now in common use. If too much resin is present in the grinding mix it is far more difficult to rupture and displace the adsorbed film of air, and this accounts for the long milling periods and higher powered machines required in the present stage of the art of pigment dispersion.

In accordance with my invention, the pigment content of the mix is increased to what would be an excessive amount for ordinary pebble or ball mill operations. Depending upon the pigment employed, the mix contains from about 50% to about 85% by weight of pigment. Likewise, it contains less than 8% of resin, generally from 2% to 5% by weight. An organic solvent for the resin comprises the remainder of my mixes. Organic pigments are ordinarily less dense than inorganic pigments, so smaller amounts of the former would be employed. As a general rule, however, particularly for inorganic pigments, I employ in my mix pigment concentrations of 65% and higher.

My pigment-vehicle mixes are characterized initially by a solid, dough-like appearance, which to one not familiar with this invention would be considered totally unworkable in any low-powered equipment. The ratio by weight of resin to solvent in my mixes is within the range of 1:3 to 1:9. A practical resin-solvent ratio for general use is one part resin to five parts solvent. The amount of vehicle of course will depend upon the amount of pigment, since as a general rule my mix is composed almost entirely of pigment and vehicle.

White and light colored pigments are frequently darkened or thrown off shade when they are dispersed in a steel ball mill, therefore, I prefer to use the pebble mill in carrying out the process of my invention. When my mix is first added to a pebble mill it is so solid and viscous that it would appear to be absolutely impossible for any pebbles to cascade through it. As a matter of fact, initially it literally congeals the pebbles in place in the mill. After the mill is closed and first set in operation the pebbles are unable to cascade. However, after an initial period of operation, which usually ranges from ½ hour to 1 hour, the pebbles in the mill unexpectedly begin to cascade, and thereafter the operation proceeds as though a low-density pigmented base were being treated. It is continued until a uniform, free-flowing, well-dispersed, pigmented base is obtained. Ordinarily this will take from about 10 to about 16 hours, as contrasted with the usual period of several days heretofore required for this operation. Hence my invention has the advantage not only of producing a high-density pigmented base in a low-powered mill but it also markedly reduces the length of time required for completion of the operation.

To determine when a mix is completed it is customary to open the mill and remove a small sample. The sample is then carried to the laboratory and mixed with additional quantities of solvent and resin. If the final mixture is smooth and uniform it is considered that the base has been milled sufficiently. In my process, however, this procedure cannot be used as the final laboratory suspension would almost invariably lack uniformity and smoothness. Instead it would contain large masses of agglomerates which could be broken up and dispersed throughout the suspension only with the greatest difficulty. To one not familiar with this invention, the results of this test would conclusively establish that the mixing operation was either incomplete or defective. However, no matter how long this operation is continued, the same agglomerates and non-uniform suspensions would be obtained with the laboratory samples.

I have found that a specially devised procedure must be applied to the testing of my mixes. This, I believe, is due to the fact that their resin content is so low in relation to the excessive amount of pigment present that the slight evaporation of solvent which occurs when part of the sample dries out on the side of the container as it is carried from the mill to the laboratory, upsets the delicate balance between the two and causes re-agglomeration of a portion of the pigment. Also, there is a tendency to form a "skin" on the surface of the sample as some of the solvent evaporates, and this further aggravates the partial re-agglomeration of a portion of the pigment. Once such re-agglomeration occurs in a portion of the sample, it is almost impossible to obtain a smooth, uniform dispersion by the customary laboratory procedure. Instead of following this procedure, I pour my sample carefully into a relatively large volume of organic solvent without touching the sides of the container, immediately upon its removal from the mill. By pouring the sample as soon as it is removed from the mill directly into the solvent, the difficulties referred to previously are avoided. The sample is then sufficiently stable so that it may be mixed with additional resins and tested in the usual way. When so tested it will be found that the milling operation is complete in a fraction of the time required by prior methods.

Upon completion of the milling operation, but before removing the base from the mill, I prefer to incorporate additional vehicle in the base. While this step is not absolutely essential, it is highly desirable and constitutes a very important embodiment of my invention, since it imparts to the resulting products an unusual degree of stability. As a result, these products may be stored for extended periods of time and under widely varying conditions without re-agglomeration, skinning or livering-up, and without excessive settling.

To accomplish this stabilization step, upon completion of the milling operation, I add to the mix from about ¾ to about 1½ times the amount of resin added to the original charge, although these figures may be varied if desired. For this operation, a vehicle may be employed containing a much larger percentage of resin than the original vehicle. If desired, the vehicle may contain just enough organic solvent to facilitate addition of the resin to the mix, as I believe it is the resin alone which imparts the desired degree of stability to the mix. I have found that a vehicle containing, by weight, 50% resin and 50% organic solvent can be used generally for this purpose. After addition of the cut-back vehicle to the mix, as aforesaid, it may be uniformly incorporated therein by closing the mill and continuing with the milling operation for a short period, generally about one-half hour.

When the cut-back vehicle is incorporated throughout the original mix, the mill is stopped and the base emptied into suitable containers for storage or shipment. These products are characterized by a smooth, free-flowing appearance and a surprisingly high density. Because of their uniformity, fluidity and stability, coupled with their high-pigment, low-vehicle content, they are admirably adapted for use as universal bases. By mixing them with suitable oils, resins and/or solvents an unusually wide variety of paints, enamels, lacquers and finishing materials generally may be produced. Due to the general adaptability of my bases, manufacturers of protective coatings need carry but a relatively few of them in stock, as contrasted with the extremely large number of bases heretofore required.

My invention is applicable to the treatment of organic and inorganic pigments generally, as well as mixtures of two or more pigments. It is particularly suitable for white and light colored pigments which are easily thrown off shade by some dispersion processes. The vehicles employed may contain such natural or synthetic resins and organic solvents therefor, as are customarily employed in the manufacture of paints, enamels, lacquers and the like. Since the products are used for the manufacture of a wide variety of finishes it is advisable to select resins and solvents which are compatible with the products to be prepared ultimately. I have found that synthetic organic condensation resins are well-suited for this purpose, particularly phthalic anhydride-alkyd resins, maleic anhydride-alkyd resins, urea-formaldehyde resins, and melamine-formaldehyde resins. Preferred condensation resins for general use are those sold under the trade names "Amberlac D-96," and "Uformite F-240."

While the cut-back vehicle for stabilization purposes may contain different resins and solvents than the vehicle for the original charge, this is not necessary, especially when general purpose resins and solvents are used. A particularly satisfactory all-purpose resin is "Uformite F-240." It may be dissolved in xylol or other solvent and used generally in the vehicle for the original charge and in the cut-back vehicle.

My invention may be more readily understood by a consideration of the following illustrative examples.

EXAMPLE No. 1

(36" x 42") pebble mill with 800 lbs. flint pebbles
Load:
   Amberlac D-96 (50% in xylol)
                                  gallons__ 2¾
   Uformite F-240 _____do____ 2¾
   Solvesso-xylol _____do____ 16½
   Titanium dioxide _____pounds__ 495
   Run 10 hours and add Uformite F-240
                                  gallons__ 5⅜

Mix ½ hour and unload.
Yield, 42¾ gals. (705 lbs).

EXAMPLE NO. 2

(36" x 42") pebble mill with 800 lbs. flint pebbles
Load:
   Amberlac D-96 (50% in xylol) _gallons__ 2½
   Uformite F-240 _____do____ 2½
   Solvesso-xylol _____do____ 14¼
   Light chrome yellow (Imperial X-1981)
                                  pounds__ 800
   Run 10 hours and add Uformite F-240
                                  gallons__ 5⅜

Mix ½ hour and unload.
Yield, 42⅞ gals. (987 lbs.).

The above examples were repeated employing the following pigments, resins and solvents:

| Per Cent and Kind Pigment (by weight) | Per Cent and Kind Resin (dry weight of resin) | Per Cent and Kind Solvent (by weight) |
|---|---|---|
| 84.75% Chrome Yellow, Light | 2.4%—50% Alkyd "A," 50% Urea "B" | 12.85% Xylol. |
| 84.50% Chrome Yellow, Light | 2.12% Alkyd "C" | 13.50% Xylol. |
| 84.00% Chrome Yellow, Light | 3.00% Phenolic "D" | 13.00% Xylol. |
| 80.0% Chrome Orange | 3.0%—50% Alkyd "A," 50% Urea "B" | 16.9% Xylol. |
| 80.1% Chrome Orange | 2.65% Phenolic "D" | 17.25% Xylol. |
| 85.12% Chrome Orange | 2.03% Alkyd "A" | 12.85%—Methyl Ethyl Ketone 85% Isopropyl Alcohol 15%. |
| 85.12% Chrome Orange | 2.03% Alkyd "A" | 12.85%—Acetone 85%, Isopropyl Alcohol 15%. |
| 77.7% Chrome Yellow, Medium | 3.4%—50% Alkyd "A," 50% Urea "B" | 18.9% Xylol. |
| 76.25% Chrome Yellow, Medium | 3.2% Alkyd "C" | 20.55% Xylol. |
| 77.20% Chrome Yellow, Medium | 3.1% Alkyd "E" | 19.7% Mineral Spirits. |
| 77.80% Chrome Yellow, Medium | 3.02% Phenolic "D" | 19.18% Xylol. |
| 79.0% Chrome Yellow, Medium | 2.89% Alkyd "A" | 18.11%—Methyl Ethyl Ketone 85%, Isopropyl Alcohol 15%. |
| 79.0% Chrome Yellow, Medium | 2.89% Alkyd "A" | 18.11%—Acetone 85%, Isopropyl Alcohol 15%. |
| 75.0% Titanium Dioxide | 3.83%—50% Alkyd "A," 50% Urea "B" | 21.16% Xylol. |
| 75.25% Titanium Dioxide | 3.50% Alkyd "C" | 21.25% Xylol. |
| 74.20% Titanium Dioxide | 3.53% Alkyd "E" | 22.30% Mineral Spirits. |
| 75.24% Titanium Dioxide | 3.37% Phenolic "D" | 21.39% Xylol. |
| 76.20% Titanium Dioxide | 3.23% Alkyd "A" | 20.40%—Methyl Ethyl Ketone 85%, Isopropyl Alcohol 15%. |
| 76.20% Titanium Dioxide | 3.23% Alkyd "A" | 20.40%—Acetone 85%, Isopropyl Alcohol 15%. |
| 71.50% Titanium Dioxide | 3.58% Ester "F" | 24.90% Xylol. |
| 75.25% Titanium Dioxide | 3.50% Urea "G" | 21.25% Xylol. |
| 72.0% Chrome Green, Light | 4.28%—50% Alkyd "A," 50% Urea "B" | 23.72% Xylol. |
| 67.4% Chrome Green, Deep | 5.0%—50% Alkyd "A," 50% Urea "B" | 27.6% Xylol. |
| 67.50% Chrome Green, Deep | 4.50% Alkyd "C" | 28.00% Xylol. |
| 67.40% Chrome Green, Deep | 5.0% Phenolic "D" | 27.60% Xylol. |
| 72.00% Chrome Green, Deep | 4.28% Alkyd "A" | 23.70%—Methyl Ethyl Ketone 85%, Isopropyl Alcohol 15%. |
| 72.00% Chrome Green, Deep | 4.28% Alkyd "A" | 23.70%—Acetone 85%, Isopropyl Alcohol 15%. |
| 54.8% Ironoxide, Red | 6.8%—50% Alkyd "A," 50% Urea "B" | 38.4% Xylol. |
| 54.75% Ironoxide, Red | 6.25% Phenolic "D" | 39.00 Xylol. |
| 48.8% Iron Blue | 7.75%—50% Alkyd "A," 50% Urea "B" | 43.45% Xylol. |
| Do | 6.8% Alkyd "C" | 44.40% Xylol. |

Alkyd "A"—Amberlac D-96—Resinous Products Corporation—Alkyd based on Maleic Anhydride.
Urea "B"—Uformite F-240—Resinous Products Corporation—Specially processed Urea-formaldehyde.
Alkyd "C"—Glyptal 2462—General Electric Company—Soya modified Phthalic Anhydride alkyd.
Phenolic "D"—Beckacite 1112—Reichhold Chemicals, Inc.—"Modified" phenolic (modifier is probably an ester gum).
Alkyd "E"—Glyptal 2464—General Electric Company—Soya modified Phthalic Anhydride alkyd.
Ester "F"—Polypale Ester—Hercules Powder Company—Ester gum made from glycerine and the dimer of Abietic acid.
Urea "G"—Beetle 219-8—American Cyanamid Company—Normal Urea-formaldehyde.

As many apparently widely different embodiments of this invention may be made without departing from the spirit and scope hereof, it is to be understood that the invention is not limited to the specific embodiments hereof except as defined in the appended claims.

I claim:

1. A process for producing a dense, free-flowing pigmented base suitable for use in the production of paints, enamels, lacquers and related finishes, which comprises mixing together in a low-powered mixing mill a dough-like mixture of a pigment and a solvent- and resin-containing vehicle, said vehicle containing insufficient solvent to impart fluidity to said mixture but containing sufficient resin to provide 2 to 8% resin based on the weight of the entire mixture, and continuing the mixing until the mixture is reduced to a free-flowing uniform fluid suspension.

2. The process of claim 1 wherein the resulting free-flowing pigmented base is stabilized by incorporating therein additional vehicle, and continuing the mixing operation for a short period of time.

3. A process for producing a dense, free-flowing pigmented base suitable for use in the production of paints, enamels, lacquers and related finishes, which comprises mixing together in a low-powered mixing mill a pigment and a resin- and organic-solvent-containing vehicle mixture initially in the form of a solid, dough-like mass containing from about 50% to about 85% by weight of pigment of the class consisting of chromate pigments, metal oxide pigments, organic pigments and iron blue pigments and less than 8% by weight of resin, the ratio of resin to organic solvent in said vehicle being within the range of about 1:3 to about 1:9 and continuing the mixing until the mixture is reduced to a free-flowing uniform fluid suspension of said pigment in said vehicle.

4. A process for producing a dense, free-flowing pigmented base suitable for use in the production of paints, enamels, lacquers and related finishes, which comprises mixing together in a pebble mill for a sufficient period of time to obtain a free-flowing, uniform, fluid suspension a pigment and a vehicle containing a synthetic organic condensation resin, said mixture initially comprising a solid, dough-like mass unworkable in low-powered mixers, containing from about 50% to about 85% by weight of pigment of the class consisting of chromate pigments, metal oxide pigments, organic pigments and iron blue pigments and less than 8% by weight of resin, the ratio of resin to organic solvent in said vehicle being approximately 1 to 5, the resulting free-flowing pigment base being stabilized by incorporating therein additional vehicle and continuing the mixing operation for a sufficient time to uniformly disperse said additional vehicle throughout the pigment base.

5. A process for preparing a dense high-pigment-content free-flowing pigment base for coating finishes, which process comprises pebble milling a dough-like mixture of titanium dioxide pigment and a coating vehicle, said mixture having by weight about 71.5 to about 76.2% of titanium dioxide pigment, about 3.23 to about 3.83% of a coating resin, and about 20.4 to about 24.9% of a coating solvent for said resin, continuing the milling until the mixture is reduced to a free-flowing uniform dispersion of said pigment in said vehicle, then adding a stabilizing amount of coating vehicle, and continuing the milling until the mixture is stabilized against agglomeration.

6. A process for preparing a dense high-pigment-content free-flowing pigment base for coating finishes, which process comprises pebble milling a dough-like mixture of chrome yellow pigment and a coating vehicle, said mixture having by weight about 76.25 to 84.75% of chrome yellow pigment, about 2.12 to 3.4% of a coating resin and about 12.85 to 20.55% of a coating solvent for said resin, continuing the milling until the mixture is reduced to a free-flowing uniform dispersion of said pigment in said vehicle, then adding a stabilizing amount of coating vehicle, and continuing the milling until the mixture is stabilized against agglomeration.

7. A process for preparing a dense high-pigment-content free-flowing pigment base for coating finishes which process comprises pebble milling a dough-like mixture of chrome orange pigment and a coating vehicle, said mixture having by weight about 80 to 85.12% of chrome orange pigment, about 2.03 to 3% of a coating resin, and about 12.85 to 17.25% of a coating solvent for said resin, continuing the milling until the mixture is reduced to a free-flowing uniform dispersion of said pigment in said vehicle, then adding a stabilizing amount of coating vehicle, and continuing the milling until the mixture is stabilized against agglomeration.

DWIGHT CLARK PECK.

REFERENCES CITED

The following references are of record in the file of this patent:

UNITED STATES PATENTS

| Number | Name | Date |
| --- | --- | --- |
| 2,232,426 | Barrett | Feb. 18, 1941 |
| 2,280,135 | Ward | Apr. 21, 1942 |

OTHER REFERENCES

Page 3, Protective and Decorative Coatings, Mattiello, vol. II, 1942. Published by John Wiley and Sons, Inc., New York, New York.